United States Patent
Klimesch et al.

(10) Patent No.: US 9,463,810 B2
(45) Date of Patent: Oct. 11, 2016

(54) METHOD AND DEVICE FOR DETERMINING AND DISPLAYING A REMAINING RANGE OF A MOTOR VEHICLE, AND MOTOR VEHICLE HAVING A DEVICE FOR DETERMINING AND DISPLAYING A REMAINING RANGE

(71) Applicant: Audi AG, Ingolstadt (DE)

(72) Inventors: Michael Klimesch, Ingolstadt (DE); Jens Papajewski, Unterhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/384,108

(22) PCT Filed: Feb. 23, 2013

(86) PCT No.: PCT/EP2013/000535
§ 371 (c)(1),
(2) Date: Sep. 9, 2014

(87) PCT Pub. No.: WO2013/135343
PCT Pub. Date: Sep. 19, 2013

(65) Prior Publication Data
US 2015/0061855 A1 Mar. 5, 2015

(30) Foreign Application Priority Data
Mar. 10, 2012 (DE) .......... 10 2012 004 930

(51) Int. Cl.
*B60W 50/14* (2012.01)
*G01D 13/22* (2006.01)
(Continued)

(52) U.S. Cl.
CPC ............. *B60W 50/14* (2013.01); *B60K 35/00* (2013.01); *B60L 11/12* (2013.01); *B60L 11/1861* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2009/0045042 A1* | 2/2009 | Browne et al. | .......... 204/157.15 |
| 2010/0073156 A1 | 3/2010 | Gohring et al. | |
| 2014/0097673 A1 | 4/2014 | Papjewski et al. | |

FOREIGN PATENT DOCUMENTS

| | | |
|---|---|---|
| CN | 10 1708694 | 5/2010 |
| CN | 102079250 | 6/2011 |

(Continued)

OTHER PUBLICATIONS

International Search Report issued by the European Patent Office in International Application PCT/EP2013/000535 on Jun. 26, 2013.
(Continued)

*Primary Examiner* — Brian Zimmerman
*Assistant Examiner* — Cal Eustaquio
(74) *Attorney, Agent, or Firm* — Henry M. Feiereisen LLC.

(57) ABSTRACT

In a method for determining and displaying a remaining range of a motor vehicle that can be driven electrically, an instantaneous remaining range of the motor vehicle that can be attained by purely electric driving of the motor vehicle is determined continuously and a display of the determined remaining range on a display unit is controlled, wherein a range preservation mode is activated with the control unit; and the display unit is activated with the control unit. A remaining range determined before the activation of the range preservation mode is displayed with the display unit while the range preservation mode is activated. A device for determining and displaying a remaining range of a motor vehicle that can be driven electrically and a motor vehicle having a device for determining and displaying a remaining range are also disclosed.

14 Claims, 2 Drawing Sheets

(51) Int. Cl.

| | |
|---|---|
| *B60K 35/00* | (2006.01) |
| *B60W 10/08* | (2006.01) |
| *B60W 10/26* | (2006.01) |
| *B60L 11/12* | (2006.01) |
| *B60L 11/18* | (2006.01) |
| *B60W 10/06* | (2006.01) |
| *B60W 20/00* | (2016.01) |
| *B60W 40/10* | (2012.01) |

(52) U.S. Cl.
CPC .............. *B60W 10/06* (2013.01); *B60W 10/08* (2013.01); *B60W 10/26* (2013.01); *B60W 20/00* (2013.01); *B60W 40/10* (2013.01); *B60L 2250/16* (2013.01); *B60W 2510/244* (2013.01); *B60W 2710/244* (2013.01); *Y02T 10/6286* (2013.01); *Y02T 10/7005* (2013.01); *Y02T 10/705* (2013.01); *Y02T 10/7044* (2013.01); *Y02T 10/7077* (2013.01)

(56) References Cited

FOREIGN PATENT DOCUMENTS

| | | |
|---|---|---|
| DE | 102008015046 | 9/2008 |
| DE | 102008047923 | 3/2010 |
| DE | 102008049009 | 4/2010 |
| DE | 10201 104443 | 2/2012 |
| JP | 2001-42245 | 2/2001 |
| WO | WO 2011/123690 | 10/2011 |
| WO | WO 2012/163437 | 12/2012 |

OTHER PUBLICATIONS

"Opel Ampere 08/2011 Betriebsanleitung", Rüsselsheim, Germany, Aug. 31, 2011.

Chinese Search Report issued on Mar. 28, 2016 with respect to counterpart Chinese patent application 201380013454.6.

Translation of Chinese Search Report issued on Mar. 28, 2016 with respect to counterpart Chinese patent application 201380013454.6.

* cited by examiner

METHOD AND DEVICE FOR DETERMINING AND DISPLAYING A REMAINING RANGE OF A MOTOR VEHICLE, AND MOTOR VEHICLE HAVING A DEVICE FOR DETERMINING AND DISPLAYING A REMAINING RANGE

CROSS-REFERENCES TO RELATED APPLICATIONS

This application is the U.S. National Stage of International Application No. PCT/EP2013/000535, filed Feb. 23, 2013, which designated the United States and has been published as International Publication No. WO 2013/135343 and which claims the priority of German Patent Application, Serial No. 10 2012 004 930.7, filed Mar. 10, 2012, pursuant to 35 U.S.C. 119(a)-(d).

BACKGROUND OF THE INVENTION

The invention relates to a method for determining and displaying a remaining range of a motor vehicle that can be driven electrically. Moreover, the invention relates to a device for determining and displaying a remaining range of a motor vehicle that can be driven electrically. Furthermore, the invention relates to a motor vehicle with a device for determining and displaying a remaining range.

DE 10 2008 047 923 A1 discloses a device and a method for determining and displaying a remaining range of a motor vehicle that can be driven electrically. According to the method disclosed therein, an instantaneous remaining range of the motor vehicle, which is attainable with a purely electric drive of the motor vehicle, is continuously determined, and the determined remaining range is displayed on a display unit.

DE 10 2011 102 766 A1 discloses a method for operating a device for charging a battery in a hybrid vehicle. After actuating a corresponding control element, the vehicle is operated in such a mode in which the drivable remaining range displayed by the display unit upon actuation of the control element that can be driven with the vehicle in a purely electric drive is maintained substantially constant.

SUMMARY OF THE INVENTION

It is the object of the present invention to provide a solution by which an improved display a remaining range of a motor vehicle is provided.

In an method according to the invention for determining and displaying a remaining range of a motor vehicle that can be driven electrically, an instantaneous remaining range of the motor vehicle, which is achievable with a purely electric drive of the motor vehicle, is continuously determined by a control unit and the determined remaining range is displayed on a display unit, wherein the method according to the invention is characterized by the following steps:

Detecting that a range preservation mode is activated by the control unit; and

Controlling the display unit with the control unit, whereafter a remaining range determined prior to activating the range preservation mode is displayed by the display unit while the range preservation mode is activated regardless of the currently determined remaining range.

During the range preservation mode, the motor vehicle is operated such that the remaining range of the motor vehicle that is attainable with a purely electric drive of the motor vehicle is at least substantially maintained. Depending on how the motor vehicle is operated during range preservation mode, especially the amount of power to be provided by the electric drive of the motor vehicle, the remaining range of the motor vehicle may, within certain limits, increase as well as decrease. Because the display unit displays during the range preservation mode the remaining range determined before the range preservation mode was activated, in particular the remaining range determined immediately prior to activating the range preservation mode, the fluctuations of the remaining range of the motor vehicle that may occur during the range preservation mode will not be displayed. In other words, according to the invention, the display unit is now controlled with the control unit so that a constant value for the remaining range of the motor vehicle is continuously displayed. i.e. the value for the remaining range displayed on the display unit is frozen. Any remaining range fluctuations, for example due to control deviations of the operating strategy of the motor vehicle, are therefore not visible in the range display. The remaining range fluctuations which may arise during the range preservation mode are thus not displayed to a user of the motor vehicle, thereby preventing, for example, that the user becomes annoyed by a permanently fluctuating remaining range display.

An improved method for determining and displaying a remaining range of a motor vehicle that can be driven electrically is thus provided, which allows an improved display a remaining range of a motor vehicle, wherein an output or display of a permanent constant value for the remaining range is displayed during the range preservation mode, thereby providing a particularly user-friendly display of the remaining range.

According to an advantageous embodiment of the invention, a traction battery of the motor vehicle is charged with a so-called range extender, and/or an electric drive unit, in particular an electric motor of the motor vehicle is switched off in the range preservation mode. The motor vehicle may be, for example, a hybrid electric vehicle. The motor vehicle may be designed as a so-called serial hybrid, a parallel hybrid, or as so-called power-split hybrid. By charging the traction battery and/or by the simultaneous disconnection of the electric drive unit during the range preservation mode, the remaining electric range of the motor vehicle can be maintained during the range preservation mode so as to be at least substantially constant.

According to another advantageous embodiment of the invention, a load point boost or load point of an internal combustion engine of the motor vehicle may be increased or decreased during the range preservation mode as a function of the currently determined remaining range. Should the remaining electric range of the motor vehicle drop during the range preservation mode below a predetermined threshold value, the internal combustion engine may be operated at a higher load point by increasing the load point, wherein in particular in a motor vehicle constructed as a plug-in hybrid, a generator is driven with the additional energy provided by the combustion engine, with which a traction battery of the motor vehicle is charged, whereby the remaining range of the motor vehicle may again be increased.

Should the remaining electric range of the motor vehicle exceed a predetermined threshold value during the range preservation mode, the combustion engine may be operated at a lower load point by decreasing the load point, while at the same time the electric motor is, for example, connected and/or operated at a higher load point, so that the remaining electric range again can be reduced until dropping again below the predetermined threshold value.

According to another advantageous embodiment of the invention, the remaining range determined prior to activating the range preservation mode may be displayed by the display unit for as long as the currently estimated remaining range drops below a predetermined deviation from at least one predetermined range value. In other words, the currently determined remaining range may be continuously compared during the range preservation mode with a threshold value, wherein the remaining range determined prior to activating the range preservation mode is displayed by the display unit for as long as the currently estimated remaining range does not exceed or drop below the predetermined threshold value. This ensures that the remaining range determined before activation of the range preservation mode is displayed to a user of the motor vehicle for only as long as the remaining range determined before activation of the range preservation mode does not exhibit an excessive deviation from the actual remaining range.

According to another advantageous embodiment of the invention, the instantaneous remaining range determined while the range preservation mode is activated is displayed on the display unit when the currently determined remaining range exceeds the specified deviation from the at least one predetermined range value. In other words, the actual remaining range of the motor vehicle is displayed to a user of the motor vehicle also during the range preservation mode, once an excessively large deviation arises between the range determined before activation of the range preservation mode and the actual remaining range. This ensures that a user will be notified in good time, if the remaining electric range of the motor vehicle could not be maintained at least substantially constant level, in spite of the fact that the range preservation mode is active. An undesirable breakdown of the electrically driven motor vehicle can thereby be effectively prevented.

According to another advantageous embodiment of the invention, a lower range value and an upper range value may be defined while the range preservation mode is activated, wherein the remaining range prior to activating the range preservation mode is displayed on the display unit for as long as the currently determined remaining range is located between the lower range value and the upper range value. Providing an upper and a lower threshold value additionally ensures that both exceedingly large upward and downward deviations between the frozen range value and the actual range value can be identified and a user of the motor vehicle can be notified in good time.

According to another advantageous embodiment of the invention, the range preservation mode may be activated with another control unit, wherein the control unit receives a signal from the other control unit for as long as the range preservation mode is activated. This ensures in a particularly simple manner that the control unit used to control the display unit constantly receives information as to whether the range preservation mode is active or inactive.

According to another advantageous embodiment of the invention, the control unit continuously may transmit the currently determined range to the additional control unit, wherein the additional control unit controls an operating strategy for the motor vehicle as a function of the received remaining range values. The additional control unit can then adjust the operating strategy of the motor vehicle particularly accurately in order to maintain the remaining range during the range preservation mode as well as possible.

According to another advantageous embodiment of the invention, the remaining range values transmitted to the additional control unit may be provided with a resolution suitable for determining the operating strategy. The resolution is significantly smaller than the resolution at which the display of the remaining range on the display unit is operated.

The remaining range is thus at least constantly determined with the resolution with which the remaining range is transmitted from the control unit to the additional control unit. In other words, the granularity of the resolution is determined by the resolution necessary for determining the operating strategy. The operating strategy can be matched to the obtainable remaining range by adjusting the resolution of the transmitted remaining range values.

According to another advantageous embodiment of the invention, the currently estimated remaining range may be displayed, after deactivation of the range preservation mode, by the display unit with a predetermined time delay if, at the time of deactivation of the range preservation mode, the remaining range determined prior to activating the range preservation mode is displayed on the display unit. For example, the values of the then currently present remaining range and the remaining range existing prior to activation of the range preservation mode may differ following deactivation of the range preservation mode. By adjusting the displayed remaining range only after a predetermined time delay, a sudden change in the displayed remaining range is avoided. Annoyance of a user of a motor vehicle can thus be prevented.

According to another advantageous embodiment of the invention, the currently determined remaining range may be determined with a finer resolution than displayed by the display unit. This makes it possible, for example, to transmit to the additional control unit a corresponding high-resolution remaining range for accurately determining the operating strategy, wherein at the same time annoyance of the user can be avoided due to the coarser resolution of the displayed remaining range.

According to another advantageous embodiment of the invention, the resolution of the remaining range displayed by the display unit may be adjusted in response to an energy content of at least one energy storage device of the motor vehicle. For example, the resolution may be adjusted as a function of the remaining energy content of a traction battery of the motor vehicle. Furthermore, the resolution may be adjusted in response to a remaining fuel in a fuel tank of the motor vehicle used to supply an internal combustion engine of the motor vehicle. In particular, the display of the remaining range on the display unit may be updated in successively finer steps, the less fuel is in a fuel tank and/or the lower the energy content of a traction battery is. This ensures that a user of the motor vehicle is notified in good time when the remaining range of the motor vehicle runs low, thereby preventing the motor vehicle from breaking down due to an empty traction battery and/or an empty fuel tank.

According to another advantageous embodiment of the invention, the instantaneous remaining range is continuously determined with the control unit after the expiration of predetermined route intervals and/or time intervals. In other words, the instantaneous remaining range can be continuously determined and updated after travelling specific distances and/or the expiration of specific times. The route and time intervals may likewise be adjusted depending on a speed of the motor vehicle.

A device according to the invention for determining and displaying a remaining range of a motor vehicle that can be driven electrically includes a control unit and a display unit, wherein the control unit is configured to continuously determine an instantaneous remaining range of the motor vehicle that can be attained with a purely electric drive of the motor vehicle, and to control a display of the remaining range on the display unit, wherein the device according to the invention is characterized in that the control unit is configured to detect that a range preservation mode is activated; and the control unit is configured to cause, while the range preservation mode is activated, a remaining range that was determined prior to activation of the range preservation mode to be displayed on the display unit, regardless of the currently determined remaining range.

Advantageous embodiments of the method according to the invention are also to be regarded as advantageous embodiments of the device, wherein the device includes in particular means with which the method steps can be carried out.

A motor vehicle according to the invention includes a device according to the invention for determining and displaying a remaining range or an advantageous embodiment of the device according to the invention.

Further advantages, features and details of the invention will become apparent from the following description of a preferred embodiment and the drawings. The features and feature combinations mentioned above in the description and/or the feature combinations mentioned below in the description of the drawings and/or shown separately in the figures can not only be used in the disclosed combination, but also in other combinations or in isolation, without departing from the scope of the invention.

DETAILED DESCRIPTION OF PREFERRED EMBODIMENTS

Figure 1:
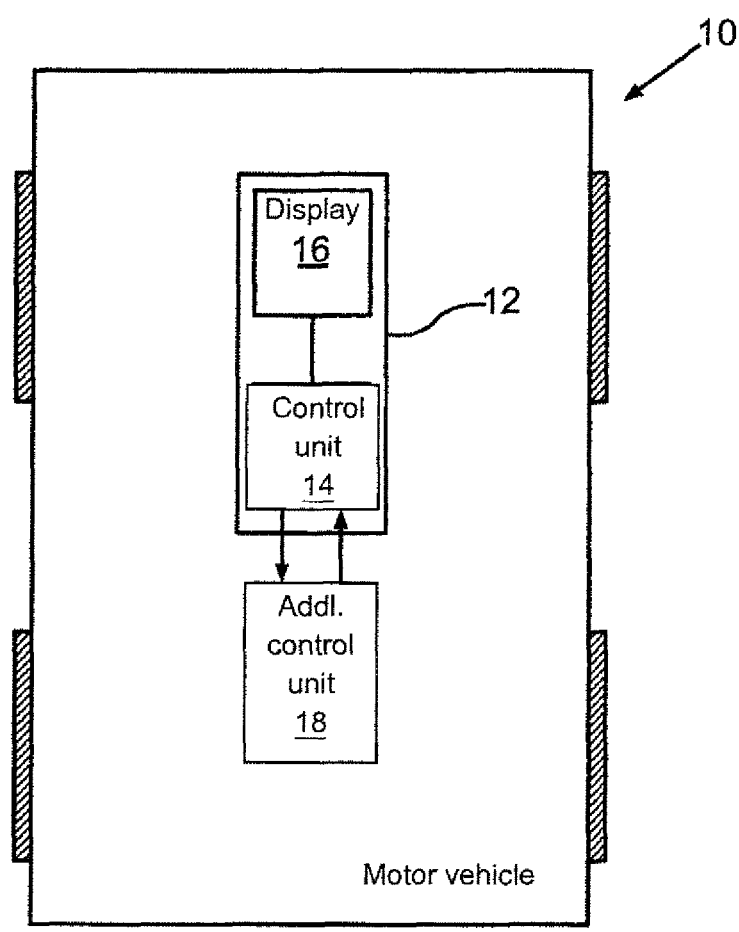
FIG. 1 a schematic diagram of a motor vehicle with a device for determining and displaying a remaining range, which includes a control unit and a display unit, wherein the control unit is coupled to an additional control unit of the motor vehicle.

FIG. 1 shows in form of a schematic diagram a motor vehicle 10 having a device 12 for determining and displaying a remaining range of the motor vehicle 10. The device 12 includes a control unit 14 configured to continuously determine an instantaneous remaining range of the motor vehicle that can be attained with a purely electric drive of the motor vehicle 10, and to control a display of the remaining range on a display unit 16 of the device 12. Moreover, the control unit 14 is coupled with an additional control unit 18 of the motor vehicle 10. The additional control unit 18 is used, inter alia, to define or control an operating strategy of the motor vehicle 10. The motor vehicle 10 may, for example, be a hybrid electric vehicle which is driven by at least one unillustrated electric motor and another energy converter and which receives corresponding energy from an operating fuel tank and a storage device for electrical energy. The motor vehicle 10 may be constructed as a so-called serial hybrid, a parallel hybrid, or a so-called power-split hybrid. The operating strategy defined or controlled by the additional control unit 18 hereby defines the interaction of the drive components contained in the motor vehicle 10. In other words, the operating strategy includes a definition about the time and the extent for operating individual components, such as an electric motor or an internal combustion engine.

Furthermore, the additional control unit 18 is configured to operate the motor vehicle 10 in a so-called range preservation mode 20, in which suitable measures are taken to keep the remaining electric range of the motor vehicle 10 substantially constant. For example, during the range preservation mode 20, an unillustrated traction battery of the motor vehicle 10 may be charged with a likewise unillustrated range extender and/or an electric drive unit, in particular an electric motor, of the motor vehicle 10 may be switched off.

In addition, during the range preservation mode 20, the load point of an internal combustion engine of the motor vehicle 10 can be raised or lowered as a function of the currently identified remaining range 24. Should the remaining electric range of the motor vehicle drop below a predetermined threshold value during the range preservation mode 20, the internal combustion engine may be operated at a higher load point by increasing the load point, wherein, in particular in a motor vehicle 10 embodied as a as a plug-in hybrid, a generator is operated with the additional energy provided by the internal combustion engine, with which a traction battery of the motor vehicle is charged, thereby increasing again the remaining range 24 of the motor vehicle 10. Should the remaining electric range 24 of the motor vehicle 10 exceed a predetermined threshold value during the range preservation mode 20, the internal combustion engine can be operated at a lower load point by reducing the load point, wherein at the same time the electric motor is, for example, connected and/or operated at a higher load point such that the remaining electric range 24 can be reduced again until it drops below the predetermined threshold value.

In addition, still further measures are also conceivable with which the remaining electric range 24 of the motor vehicle 10 can be maintained, for example kept substantially constant. It is not mandatory that the state of charge of the traction battery is kept constant; instead, it is mandatory that the remaining electric range 24 of the motor vehicle 10 is maintained commensurate with the route along which the motor vehicle 10 is to be driven.

Figure 2:
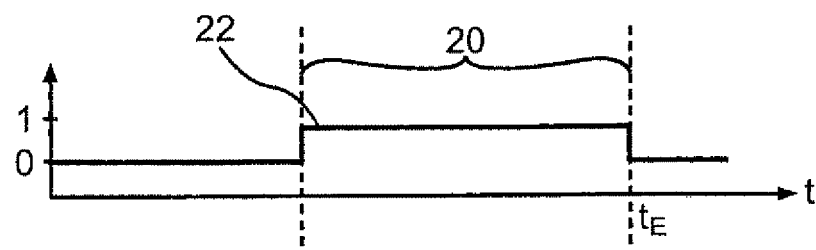
FIG. 2 a schematic diagram in which a signal that is transmitted from the additional control unit to the control unit as soon as a range preservation mode is activated is plotted on a time axis.

In FIG. 2 shows a schematic diagram, wherein a signal 22 is plotted as a function of time t, which signal is transmitted from the additional control unit 18 to the control unit 14 for as long as the range preservation mode 20 is activated. In other words, the range preservation mode 20 is activated with the additional control unit 18, wherein the control unit 14 receives the signal 22 from the other additional unit 18 for as long as the range preservation mode is activated. For example, the additional control unit 18 may transmit the signal 22 to the control unit 14 with a value=1 for as long as the range preservation mode 20 is activated and may otherwise transmit to the control unit 14 a value=0 when the range preservation mode 20 is not activated.

Figure 3:
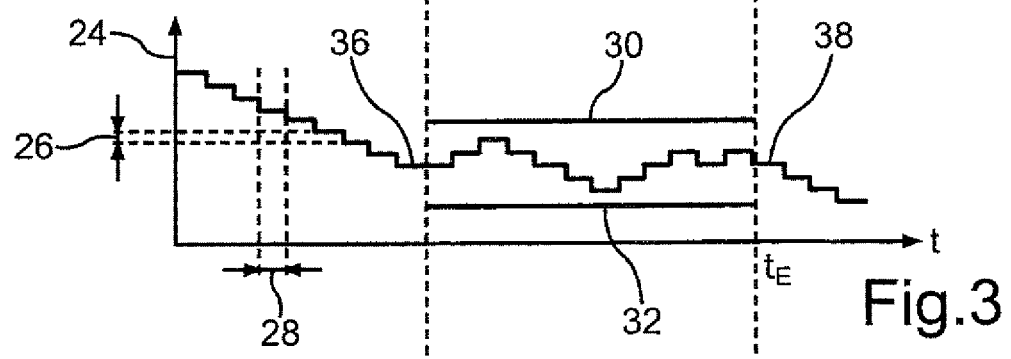
FIG. 3 a schematic diagram in which an actual remaining range of the motor vehicle determined with the control unit that can be attained with a purely electric drive of the motor vehicle is plotted as a function of the time.

In FIG. 3 shows a schematic diagram, wherein the instantaneous remaining range 24 that is continuously determined with the control unit 14 is plotted as a function of time t. The remaining range 24 is continuously determined with the control unit 14 by taking into account, for example, the consumption of the electric motor and of other auxiliary loads of the motor vehicle 10. The control unit 14 hereby transmits continuously the detected remaining range values 24 to the additional control unit 18, wherein the additional control unit 18 in turn controls an operating strategy for the motor vehicle 10 as a function of the received remaining range values 24. The remaining range values 24 transmitted to the additional control unit 18 are transmitted with a resolution sufficient for determining the operating strategy and optionally suitably converted beforehand. The instantaneous remaining range 24 can then be continuously determined by the control unit 14 following the expiration of specified time intervals 28. Moreover, the instantaneous remaining range of 24 may also be continuously calculated anew after traveling predetermined route intervals, for example, after having traveled defined distances with the motor vehicle 10.

As evident from the diagram in FIG. 3, the remaining range 24 increases and decreases slightly during the range preservation mode 20. However, the remaining range 24 is substantially maintained at a nearly constant value during the range preservation mode. In addition, two predetermined range values 30, 32 are illustrated in the diagram. In the present case, the remaining range 24 moves during the range preservation mode 20 between the two predetermined range values 30, 32. Depending on the operating strategy of the motor vehicle 10, the remaining range 24 may during range preservation mode 20 also exceed or drop below the predetermined range values 30, 32.

Figure 4:
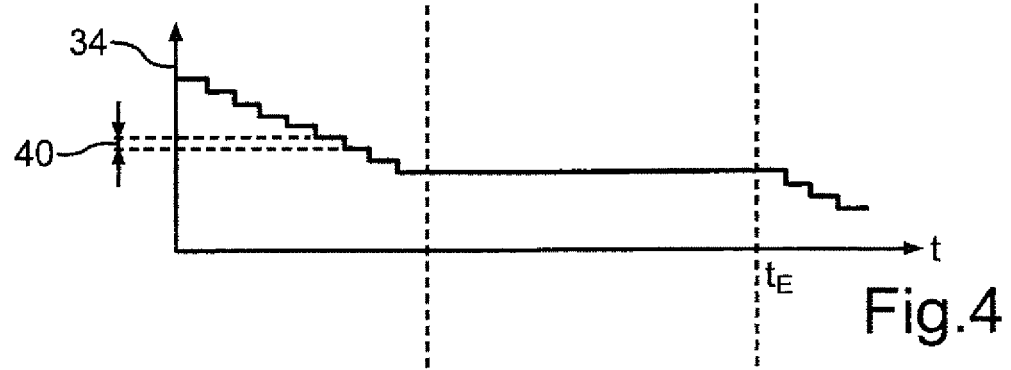
FIG. 4 a schematic diagram in which the remaining range of the motor vehicle displayed on the display unit is plotted as a function of the time.

FIG. 4 shows a schematic diagram, wherein the remaining range 34 displayed on the display unit 16 is plotted as a function of time t. As is evident from the present diagram, the displayed remaining range 34 has a constant value during the range preservation mode 20. Prior to and after the range preservation mode 20, the values of the remaining range 24 in FIG. 3 and the values of the displayed remaining ranges 34 are in agreement. The remaining range 34 may be outputted on the display unit 16 as a numerical value and continuously updated.

In addition, the resolution of the remaining range 34 displayed by the display unit 16 is adjusted as a function of an energy content of at least one energy storage device of the motor vehicle. For example, the resolution 40 may be adjusted as a function of a remaining energy of a traction battery of the motor vehicle 10. Moreover, the resolution 40 may be adjusted as a function of a remaining fuel quantity of a fuel tank of the motor vehicle 10 supplying fuel to an internal combustion engine of the motor vehicle 10. In particular, the displayed remaining range 34 may be updated on the display unit 16 in successively finer increments, commensurate with diminishing fuel levels in the fuel tank and/or reduced stored energy of a traction battery. In other words, the displayed remaining range 34 is updated with diminishing energy content of the traction battery and/or diminishing content of the fuel tank in ever smaller increments as a function of the time t or as a function of a distance traveled by the motor vehicle 10. However, the displayed remaining range 34 may also be displayed on the display unit 16 in the form of a histogram, which may for example correspond to the diagram in FIG. 4.

A method for determining and displaying a remaining range 24 of the electrically driven motor vehicle 10 will now be explained in conjunction with FIGS. 1 to 4. As soon as the range preservation mode 20 is activated, this is recognized by the control unit 14, since the control unit 14 receives a corresponding signal 22 from the other control unit 18, for as long as the range preservation mode 20 is activated. The control unit 14 then controls the display unit 16 such that the remaining range 36 determined prior to activating the range preservation mode 20 is displayed by the display unit 16 while the range preservation mode 20 is activated. The remaining range 36 determined prior to activating the range preservation mode 20 is displayed by the display unit 16 for as long as the currently determined remaining range 24 drops below a predetermined deviation from the predetermined range values 30, 32. In the present case, a lower range value 32 and an upper range value 30 are defined while the range preservation mode 20 is activated, wherein the remaining range 36 prior to activating the range preservation mode 20 is displayed on the display unit 16 for as long as the currently determined remaining range 24 is located between the lower range value 32 and the upper range value 30. If the currently established range 24 exceeds or drops below the predetermined range values 30, 32, the currently estimated remaining range 24, i.e. actual remaining range of the motor vehicle 10, is shown on the display unit 16 while the range preservation mode 20 is activated.

Following deactivation of the range preservation mode 20, the remaining range 38 determined at the time of the deactivation of the range preservation mode 20 is displayed with the display unit 16 with a predetermined time delay, when at the time $t_E$ when the range preservation mode 20 is deactivated the remaining range 36 determined prior to activating the range preservation mode 20 is still displayed by the display unit 16. In other words, the displayed remaining range 34 on the display unit 16 is not abruptly updated after the end of the range preservation mode 20, but the displayed remaining range 34 is adjusted to the actual remaining range 24 over a predetermined time period, for example within half a minute.

The invention claimed is:

1. A method for displaying a remaining range of an electrically drivable motor vehicle, comprising:
   continuously determining with a control unit a value of an instantaneous remaining range of the motor vehicle attainable with a purely electric drive of the motor vehicle,
   detecting with the control unit when a range preservation mode is activated,
   defining, while the range preservation mode is activated, a lower range value and an upper range value,
   freezing under control of the control unit a display of value of the instantaneous remaining range that was determined at the time the range preservation mode was activated for as long as the instantaneous remaining range that continues to be determined, while the range preservation mode is activated remains between the lower range value and the upper range value.

2. The method of claim 1, further comprising
   while the range preservation mode is active, charging a traction battery of the motor vehicle with a range extender.

3. The method of claim 1, further comprising
   while the range preservation mode is active, switching an electric drive unit of the motor vehicle off.

4. The method of claim 3, wherein the electric drive unit is an electric motor.

5. The method of claim 1, further comprising
   while the range preservation mode is active, increasing or decreasing a load point of an internal combustion engine of the motor vehicle as a function of the instantaneous remaining range.

6. The method of claim 1, wherein the range preservation mode is activated by an additional control unit, and wherein the control unit receives a signal from the additional control unit for as long as the range preservation mode is active.

7. The method of claim 6, further comprising continuously transmitting with the control unit the instantaneous remaining range to the additional control unit, and controlling with the additional control unit an operating strategy for the motor vehicle as a function of remaining range values received by the additional control unit.

8. The method of claim 7, wherein the remaining range values transmitted to the additional control unit are provided in a resolution suitable for determining the operating strategy.

9. The method of claim 1, further comprising when at a time when the range preservation mode is deactivated, the instantaneous remaining range determined prior to activating the range preservation mode is still displayed by the display unit, displaying the instantaneous remaining range on the display unit with a predetermined time delay after the range preservation mode is deactivated.

10. The method of claim 1, wherein the instantaneous remaining range is determined with a smaller resolution than a resolution with which the instantaneous remaining range is displayed on the display unit.

11. The method of claim 10, wherein the resolution of the instantaneous remaining range on the display unit is adjusted as a function of an energy content of at least one energy storage device of the motor vehicle.

12. The method of claim 1, wherein the instantaneous remaining range is continuously determined with the control unit after expiration of predetermined route intervals and/or of predetermined time intervals.

13. A device for displaying a remaining range of a motor vehicle that can be driven electrically, the motor vehicle comprising a display unit, and a control unit configured to continuously determine a value of an instantaneous remaining range of the motor vehicle that can be attained with a purely electric drive of the motor vehicle and to control a display of the instantaneous remaining range on the display unit, detect when a range preservation mode is activated;

define, while the range preservation mode is activated, a lower range value and an upper range value, and control the display unit of the motor vehicle so as to freeze on the Hall display unit the value of the instantaneous remaining range that was determined at the time the range preservation mode was activated for as long as the instantaneous remaining range that continues to be determined, while the range preservation mode is activated, remains between the lower range value and the upper range value.

14. A motor vehicle comprising a device for determining a remaining range of a motor vehicle that can be driven electrically, the motor vehicle comprising a display unit, and a control unit configured to continuously determine a value of an instantaneous remaining range of the motor vehicle that can be attained with a purely electric drive of the motor vehicle and to control a display of the instantaneous remaining range on the display unit, detect when a range preservation mode is activated;

define, while the range preservation mode is activated, a lower range value and an upper range value, and control the display unit of the motor vehicle so as to freeze on the display unit the value of the instantaneous remaining range that was determined at the time the range preservation unit was activated for as long as the instantaneous remaining range that continues to be determined, while the range preservation mode is activated, remains between the lower range value and the upper range value.

* * * * *